United States Patent
Häussler et al.

(10) Patent No.: US 6,186,286 B1
(45) Date of Patent: Feb. 13, 2001

(54) BRAKING DEVICE

(75) Inventors: Harald Häussler, Friolzheim; Helmut Pietsch, Ditzingen; Roland Martin, Weissach; Carsten-Jörg Mertens, Aidlingen; Artur Grunwald, Wiehl; Thomas Klaas, Reichshof; Michael Pehle, Leverkusen; Reinhold Pittius, Wiehl, all of (DE)

(73) Assignee: Dr. Ing. h.c.F. Porsche AG, Weissach (DE)

( * ) Notice: Under 35 U.S.C. 154(b), the term of this patent shall be extended for 0 days.

(21) Appl. No.: 09/210,893

(22) Filed: Dec. 16, 1998

(30) Foreign Application Priority Data

| Dec. 16, 1997 | (DE) | 197 55 754 |
|---|---|---|
| Feb. 5, 1998 | (DE) | 198 04 426 |

(51) Int. Cl.[7] ................................ F16D 55/08
(52) U.S. Cl. ........................ 188/72.1; 188/71.9
(58) Field of Search ................. 188/72.1, 196 R, 188/196 D, 71.7, 71.8, 71.9, 369, 196 BA, 196 F

(56) References Cited

U.S. PATENT DOCUMENTS

| 2,985,259 | 5/1961 | Gardner . | |
| 3,980,159 | 9/1976 | Baxendale . | |
| 4,256,206 | * 3/1981 | Maehara | 188/71.9 |
| 4,355,708 | * 10/1982 | Papagni | 188/196 D |
| 4,721,190 | * 1/1988 | Schmidt et al. | 188/71.9 |
| 5,353,896 | * 10/1994 | Baumgartner et al. | 188/71.9 |
| 5,443,141 | * 8/1995 | Thiel et al. | 188/71.9 |
| 5,568,845 | * 10/1996 | Baumgartner et al. | 188/71.9 |

FOREIGN PATENT DOCUMENTS

| 1257603 | 2/1976 | (DE) . |
| 198 04 426 C2 | 7/1999 | (DE) . |
| 0136434 | 4/1988 | (EP) . |

OTHER PUBLICATIONS

"Neue Konzepte im Bremsenbau für Nutzfahrzeuge," V. Boetz, Konstruktion 45 (1993), pp. 365–369.

* cited by examiner

Primary Examiner—Robert J. Oberleitner
Assistant Examiner—Melanie Talavera
(74) Attorney, Agent, or Firm—Evenson, McKeown, Edwards & Lenahan, P.L.L.C.

(57) ABSTRACT

A braking device for wheels of vehicles such as trailers includes a caliper in which brake linings are guided. Between these linings, at least one brake disk is displaceably held on driving toothing of a wheel hub. A pneumatically operable mechanical adjusting device interacts with the brake linings. The braking device includes at least one brake disk in a caliper which is fixed. On one end, the caliper is connected by a fastening element with an axle element of the vehicle. On the caliper, an enclosing housing for bearing the adjusting device is held. By way of a bearing plate, the adjusting device is also supported on the caliper. Pressure pistons of the device are guided by a one-part yoke in a jointly axially adjustable manner and can be acted upon by pressure with respect to the brake linings and the brake disks.

19 Claims, 9 Drawing Sheets

US 6,186,286 B1

BRAKING DEVICE

This application claims the priority of German patent application Nos. 197 55 754.6 and 198 04 426.7, filed Dec. 16, 1997 and Feb. 5, 1998, respectively, the disclosures of which are expressly incorporated by reference herein.

BACKGROUND AND SUMMARY OF THE INVENTION

This invention relates to a braking device for wheels of vehicles, particularly vehicle trailers, having a caliper and brake linings guided therein, between which at least one brake disk is arranged which is axially displaceable in a non-rotatable manner with respect to the wheel, and having a preferably pneumatically operable adjusting device. An exclusively rotationally movable drive shaft is used as the mechanical transmission element for generating a pressure of the brake linings onto the brake disk.

From European Patent Document EP 0 136 434 B1, a brake for a vehicle wheel is known which has a floating caliper which comprises several brake disks and an adjusting device with an axially displaceable drive shaft. The brake disks are displaceably held on a toothing of a wheel hub.

It is an object of the invention to provide a braking device for wheels of vehicles, particularly of vehicle trailers, which has a compact and small construction, ensures an optimal efficiency and is easy to service.

According to the invention, this object is achieved by constructing a brake caliper as a fixed caliper and having only one of the brake linings arranged on opposite sides of the brake disk carry out an application movement when the adjusting device is operating.

The principal advantages achieved by the invention are that the caliper of the device is constructed as a fixed caliper so that a small installation space is required and the caliper is light in weight, compact, and provided with an adjusting device. The adjusting device can preferably be operated pneumatically or, as an alternative, also hydraulically. The caliper can easily be fastened to the axle tube by a fastening element such as, for example, a weld, creating a linkage which projects freely toward the end of the wheel hub.

The mechanical adjusting device, such as a ball screw, is to be fastened on the caliper, together with pressure pistons operatively connected by way of a yoke. The adjusting device forms a compact constructional unit which is surrounded, for example, by a housing and is thus protected from damaging outside influences.

In particular, the ball screw spindle is axially non-displaceably arranged with respect to a steering knuckle, which has an advantageous effect on the required receiving space and simplifies the power transmission as well as the pivot bearing. A demounting or repair of the adjusting device can take place in a simple manner by removing the housing.

In order to achieve a uniform pressure distribution on the brake linings of the brake and a corresponding application movement during the braking operation, at least one pressure piston, respectively, is provided on each side of the ball screw spindle of the adjusting device. These pressure pistons are advantageously operated by the connecting one-part yoke with the same force via the spindle. An axial movement is transmitted to the yoke by way of the ball screw and therefore also to the pressure piston. The pressure pistons are axially guided during adjustment by interior guide pins so that a mutually nested guide which is protected against outside influences is obtained and an axial guiding of the pressure pistons is ensured in every case.

The support of the spindle preferably takes place in a bearing of a bearing plate of the caliper which forms an abutment and furthermore by way of a bearing in the housing neck so that sufficient support is provided. Support of the spindle can also take place in the neck or at the outlet of the housing which then forms the abutment. Thus, a virtual reversal of the power flux is achieved with respect to the other construction with the bearing plate.

The bearing plate is simultaneously provided with lateral, projecting and stepped legs. These are used for fastening on the fastening element which is connected with the wheel axle, for example, by welding. As a result, a simple mounting or demounting of parts of the braking devices, such as a one-part or multi-part caliper, can be carried out. In this case, the adjusting device, and more particularly the drive shaft or the ball screw spindle, is also easy to repair and mount or demount. The fastening element preferably closes off flush with the bearing plate.

The ball screw spindle is preferably offset in an approximately axially parallel manner with respect to an axis of rotation of the brake disk. This results in a small-sized and easily accessible braking device.

Between its bearing plate and its support plate, the caliper has a caliper bridge with opposite guiding edges for the brake linings. These guiding edges are constructed as slideways. The brake disks, which are arranged in front of and/or behind the brake linings during the braking operation, can therefore be displaced by the pressure pistons by way of the adjusting device against the caliper or against the supporting plate of the caliper. For this purpose, the brake disks are held on the wheel hub in a driving toothing, particularly in an involute toothing, and can be displaced on the hub in a sliding manner.

Depending on its type and application, the braking device may comprise one or several brake disks. The brake disks may be constructed as solid disks or as internally ventilated brake disks. The brake linings are constructed so as to correspond to the number of brake disks.

The adjusting device may also comprise only one pressure piston which will then be arranged coaxially with respect to the spindle. Furthermore, it is conceivable to use more than two pressure pistons when the brake lining has a particular size.

BRIEF DESCRIPTION OF THE DRAWINGS

Embodiments of the invention are illustrated in the drawings and will be described in detail.

DESCRIPTION OF THE PREFERRED EMBODIMENTS

Figure 1:
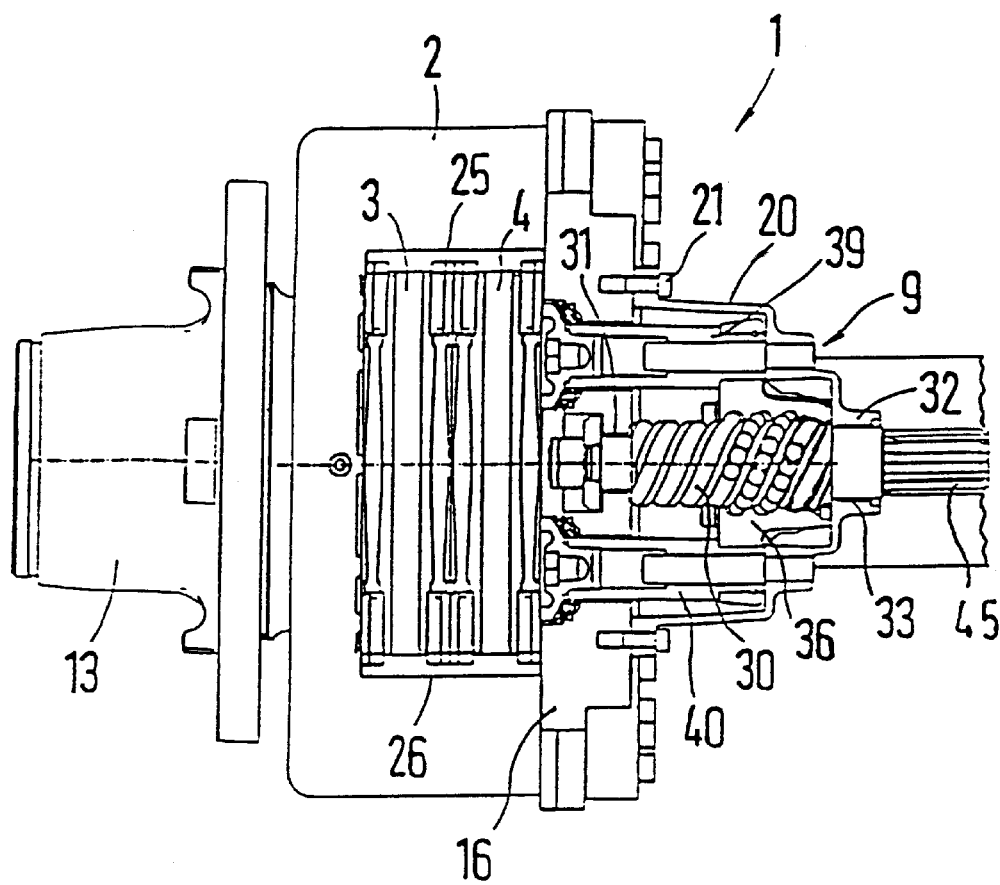
FIG. 1 is a top view of a braking device with a caliper, an adjusting device, brake disks and brake linings.

A braking device 1 for wheels of vehicles or of vehicle trailers comprises essentially a caliper 2, axially displaceable brake disks 3 and 4, a corresponding number of brake linings 5, 6, 7 and 8, and an adjusting device 9 for operating the brake. The braking device 1 is arranged in the wheel, in which case a part of the adjusting device can project out of the wheel.

The caliper 2 is constructed in one piece as a fixed caliper and, by way of a fastening element 10, is fixedly connected with an axle element, such as an axle tube 11 of the vehicle or of the trailer, on a forward end 12 so that the caliper 2 is held in a freely projecting manner toward the end of a wheel hub 13.

Figure 8:
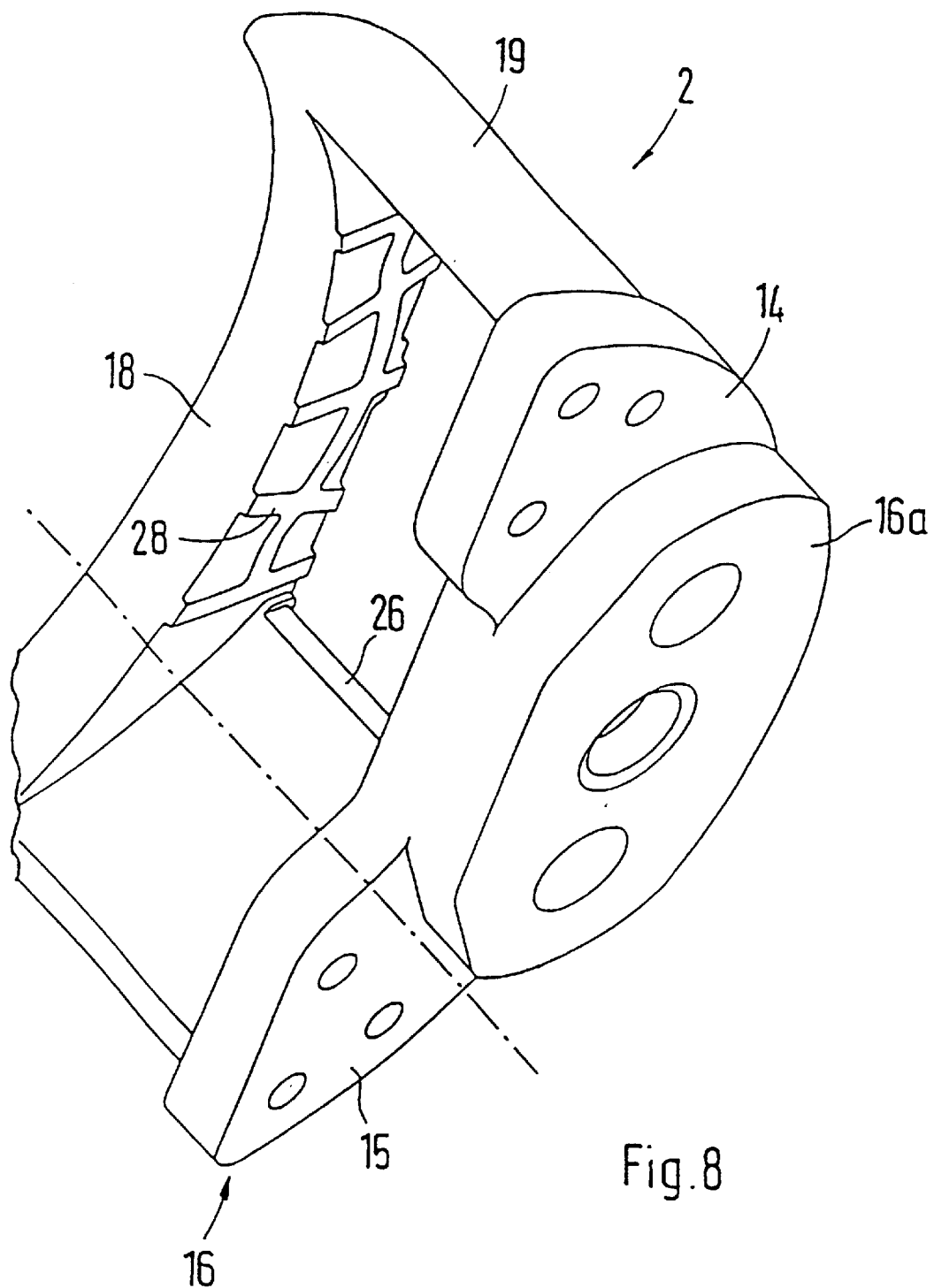
FIG. 8 is a diagrammatic view of a supporting plate of the caliper with a bearing plate.
Figure 9:
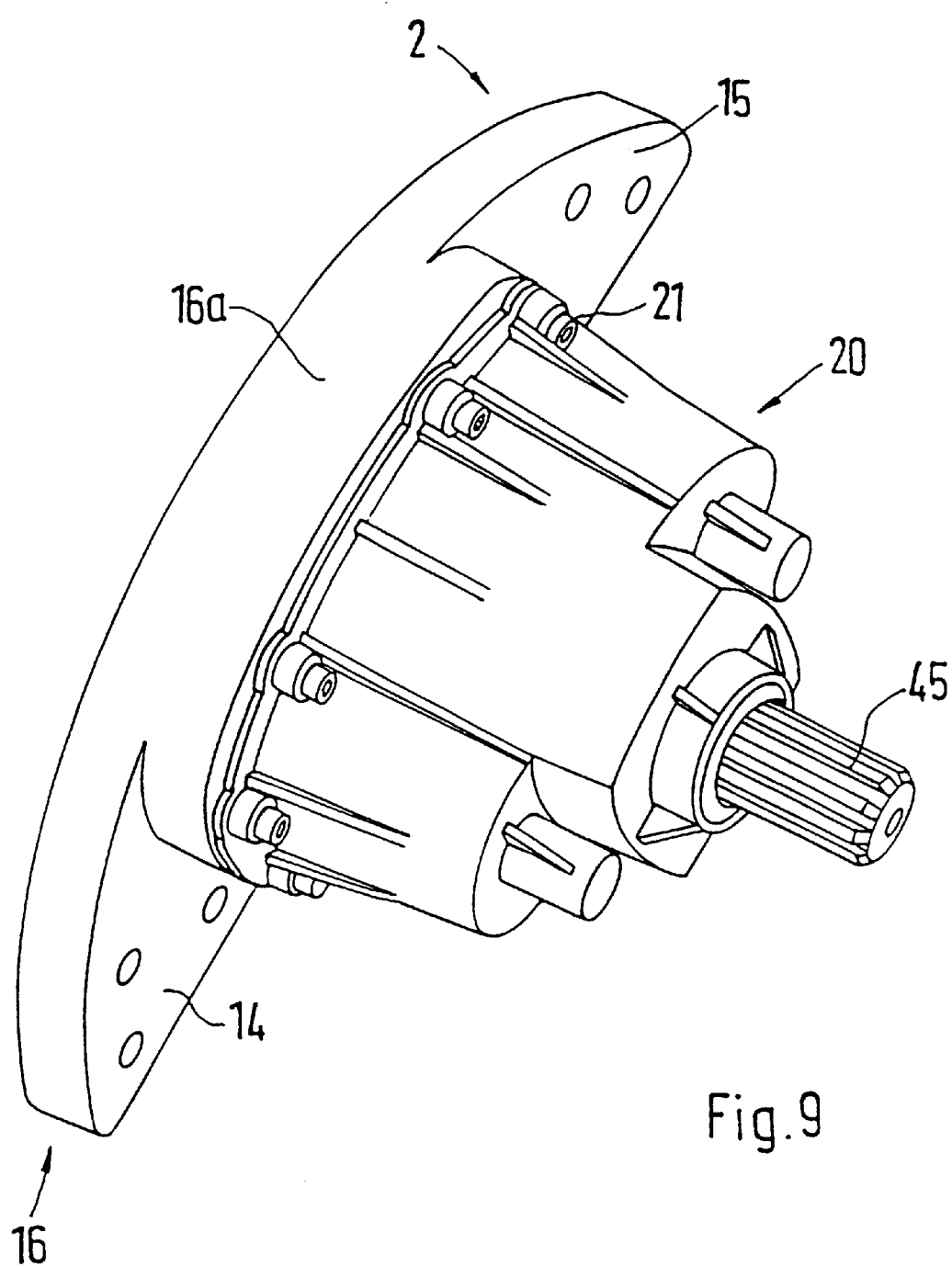
FIG. 9 is a diagrammatic representation of the bearing plate of the caliper with a screwed-on housing for the adjusting device.

For fastening the caliper 2 to the fastening element 10, the caliper has stepped legs 14 and 15 which originate from a thickened center part 16a in a bearing plate 16 and project to both sides. This is illustrated in detail in FIG. 8. The caliper 2 is connected with the fastening element 10 by way of screwing devices 17, the element 10 being arranged in the steps of the legs 14 and 15. The fastening element reaches around the axle tube 11 and is connected with it, for example, by a weld.

With respect to the wheel, the caliper 2 has, next to the forward-side bearing plate 16 at a parallel distance thereto, a supporting plate 18, in which case these plates 16 and 18 are preferably constructed in one piece by way of a caliper bridge 19. Furthermore, the caliper 2 may also consist of several parts.

In the caliper 2, the brake linings 5, 6, 7 and 8 are slidingly displaceable on guiding edges 22, 23 on the respective lining back plates on corresponding guiding edges 25, 26 of the caliper 2. The shape of the guiding edges 22, 23 and 25, 26 is constructed corresponding to the requirements. These guiding edges are only schematically shown in the drawings.

The brake disks 3 and 4 are in each case arranged between the brake linings 5 to 8 and are axially slidable on a wheel hub 13 in at least one driving toothing 27, such as an involute toothing. During the braking operating, the brake linings or the brake disks are supported on the supporting plate 18 of the caliper 2. This supporting plate 18 may have ribs 28 or similar elevations on its interior surface so that an optimal contact is ensured.

A closed housing 20 is connected by way of screwing devices 21 with the bearing plate 16. In this housing 20, the adjusting device 9 for operating the brake is arranged and disposed in a protected manner.

The adjusting device 9 comprises essentially a ball screw with a spindle 30, particularly a ball screw spindle, which is caused to rotate by way of a drive shaft 45 arranged in a rotatable but axially non-displaceable manner in the housing 20. The operation of the drive shaft can take place pneumatically, hydraulically or in a different manner. This device is not shown in detail. A ball screw device 35 in a one-piece yoke 36 is arranged corresponding to the ball screw device or the ball races 34 of the spindle 30, in its end position, the one-part yoke 36 being placed against a front face 37 of the housing 20. The ball screw devices interact with a portion 36b of the one-part yoke 36 by way of balls arranged in the ball races. The ball screw spindle 30, which is preferably constructed in one piece with the drive shaft 45, is therefore arranged in an axially non:=5 displaceable manner with respect to the axle tube 11.

The spindle 30 is rotatably supported, by way of bearings 31 and 33, in the bearing plate 16 of the caliper 2 and in the housing neck 32. The bearing plate 16 forms an abutment for the ball screw. The pistons 39, 40 are displaceable via yoke portions 36a on slide bearings G which are fixedly arranged in the bearing plate 16. Furthermore, the pistons 39, 40 can be displaced on slide bearings G1 which are each arranged in the sleeve of the pistons 39, 40. The spindle 30 is rotatably supported in the bearing plate 16 by means of a butting disk A.

Figure 10:
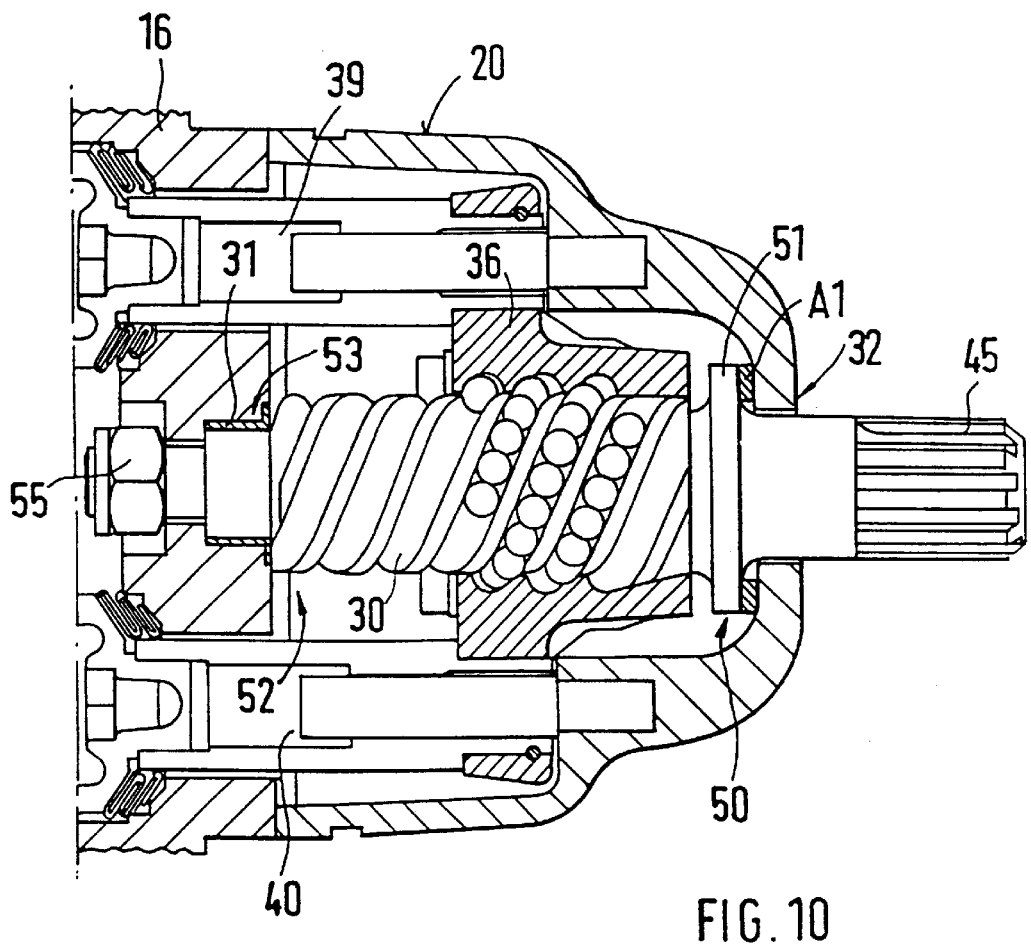
FIG. 10 is a sectional view of a part of the braking device with a housing neck as an abutment.

According to a modification shown in FIG. 10, the ball screw spindle 30 is disposed by means of its end 50 facing away from the bearing plate 16 in the housing neck 32 of the surrounding housing 20. This end 50 of the spindle 30 has an interior ring flange 51 which is supported by way of a butting disk A1 on the front side of the housing neck 32 and forms an abutment. The other end 52 of the spindle 30 facing away from the ring flange 51 has a step 53 which is held by means of a slide bearing 31 in a bore of the bearing plate 16. The fastening on the bearing plate 16 takes place by way of a lock nut 55.

One pressure piston 39 and 40, respectively, is arranged on each side of the spindle 30. These pressure pistons 39 and 40 are axially displaceably guided by way of pins 41, 42 held in the housing 20. On the end side of the pressure pistons 39, 40, piston heads 43, 44 are provided on their ends facing the brake lining 5. These pistons heads 43, 44 are guided and disposed in the bearing plate 16 of the caliper 2.

Figure 2:
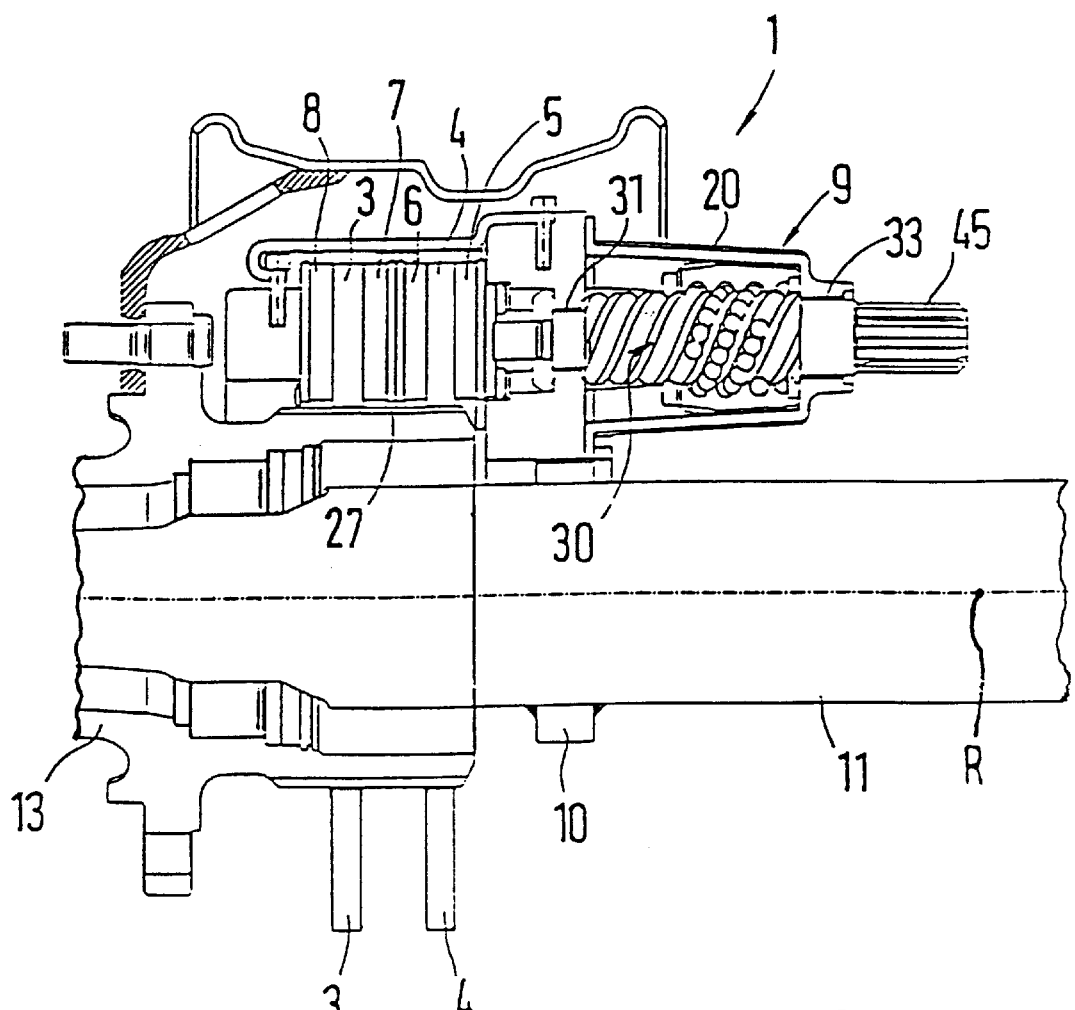
FIG. 2 is a lateral view of a braking device according to FIG. 1.
Figure 3:
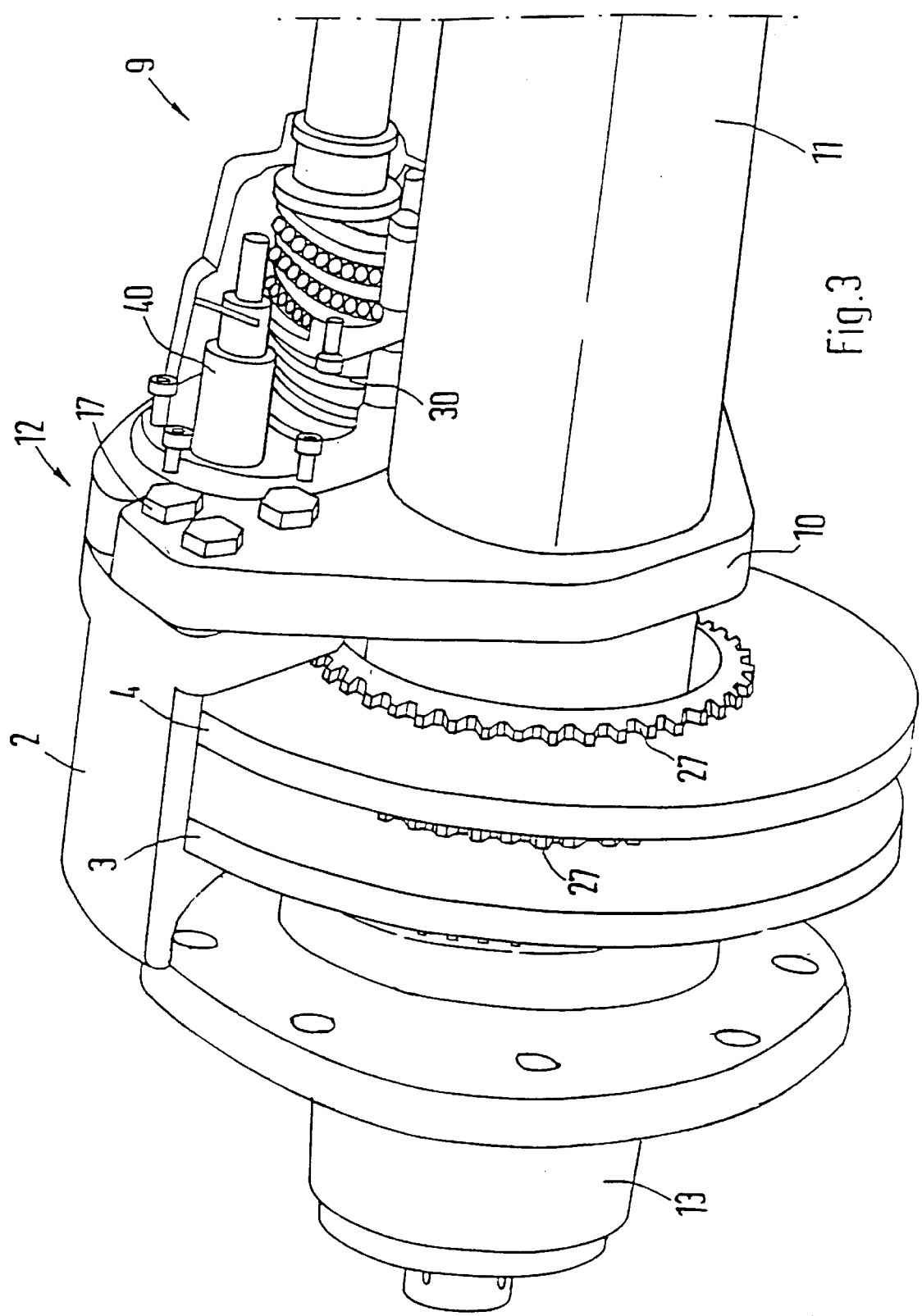
FIG. 3 is a diagrammatic representation of the braking device.
Figure 7:
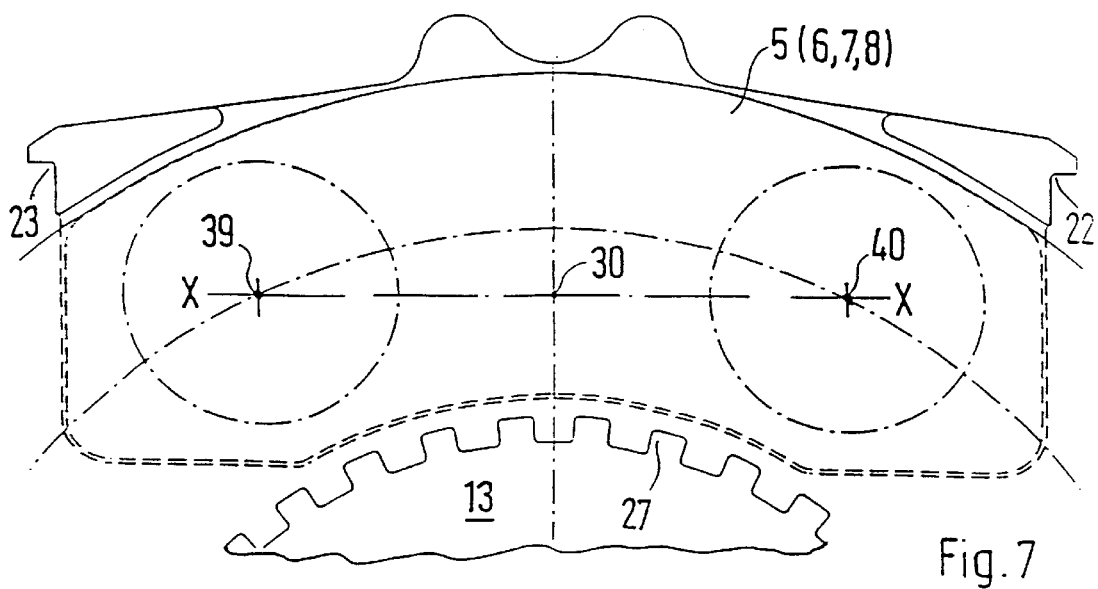
FIG. 7 is a view of a brake lining with lateral guiding edges.

The pressure pistons 39, 40 are preferably arranged in a plane X—X with the spindle 30. Pressure forces are applied approximately in the center of the respective brake linings, as is shown in detail in FIG. 7. Furthermore, the ball screw spindle 30 is arranged to be offset in an approximately axially parallel manner with respect to an axis of rotation R of the brake disk 3, 4 as is shown in FIG. 2.

Two pressure pistons 39, 40 are shown as being required because of the size of the brake lining. Embodiments with more than two pressure pistons are also conceivable. Alternatively, in the case of relatively small brake linings, only one pressure piston may be used; in this case, the piston may be arranged coaxially with respect to the spindle 30.

Preferably, the pressure pistons 39, 40 include a sleeve element, so that internal guiding can take place by way of the pins 41, 42. Solid pistons with an exterior-side guiding by way of sleeves can also be used. A torque support also takes place by way of these pins 41, 42.

Figure 4:
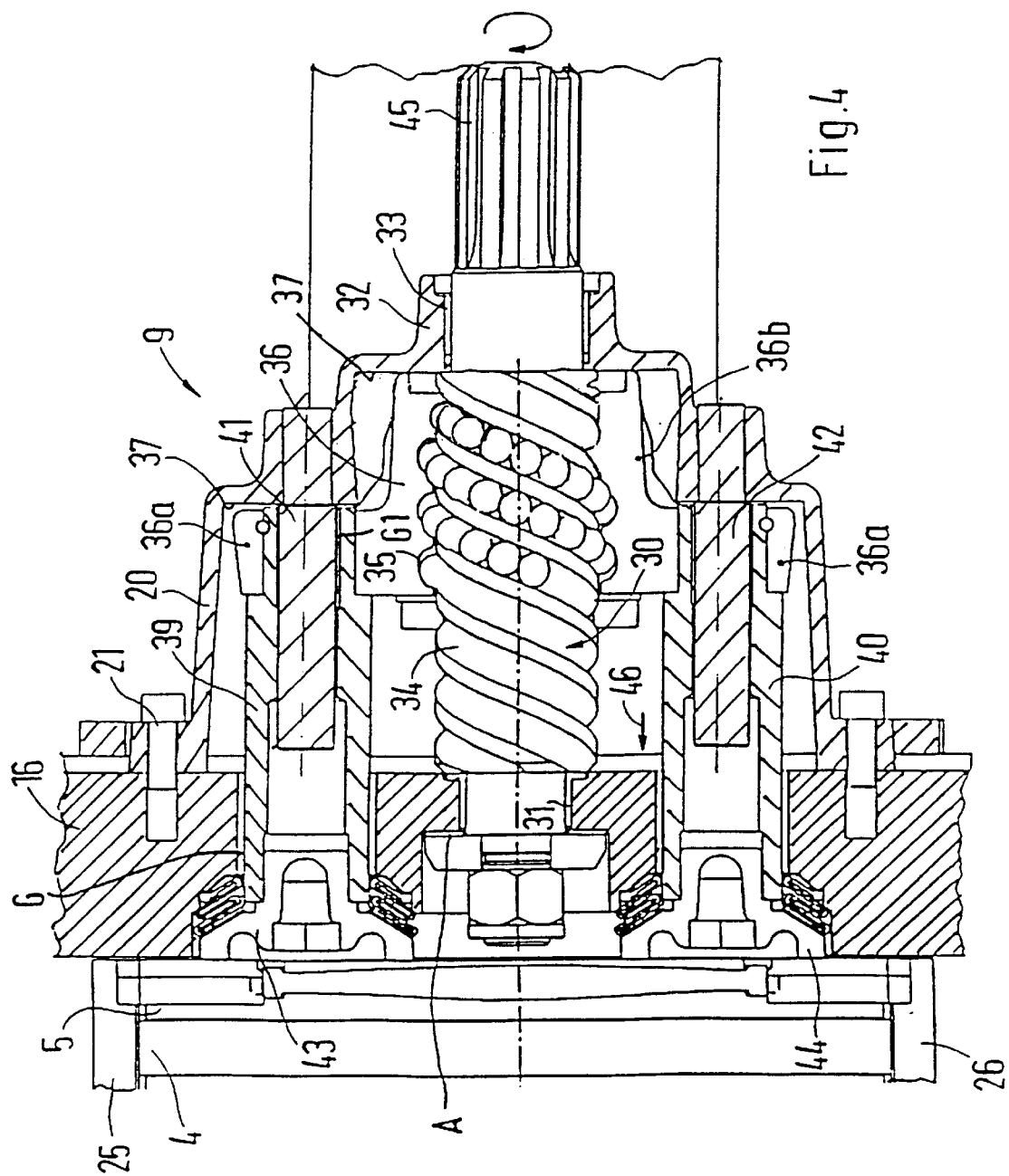
FIG. 4 is an enlarged representation of the adjusting device according to FIGS. 1 and 2.
Figure 5:
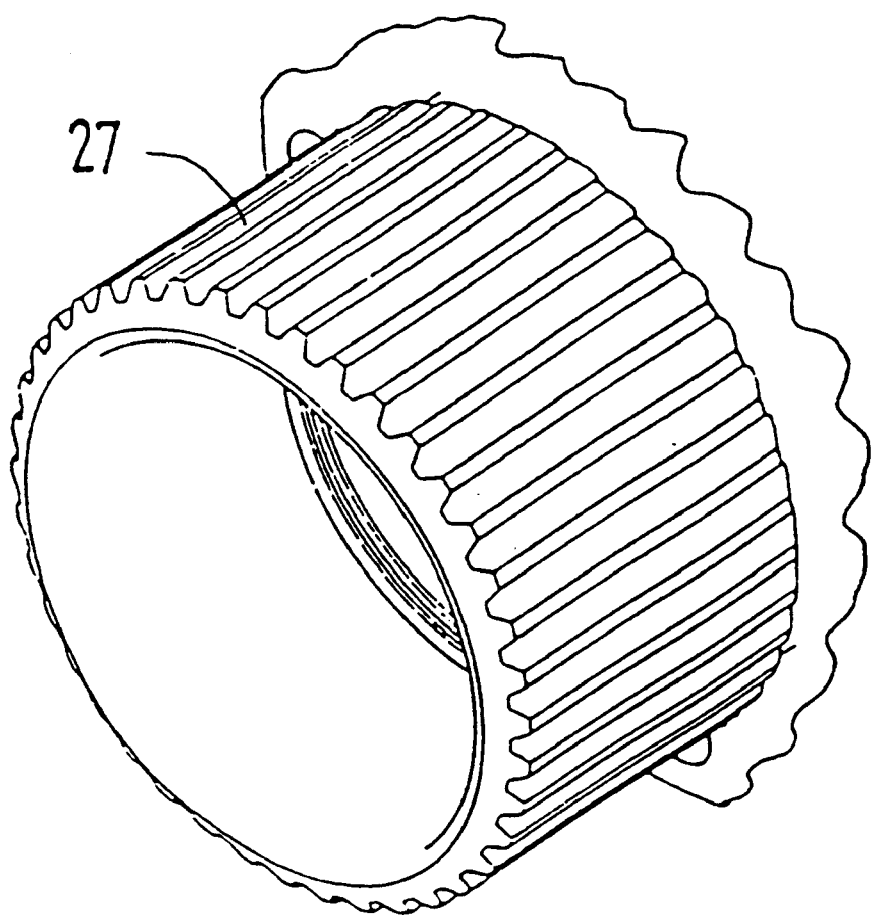
FIG. 5 is a diagrammatic representation of a driving toothing.
Figure 6:
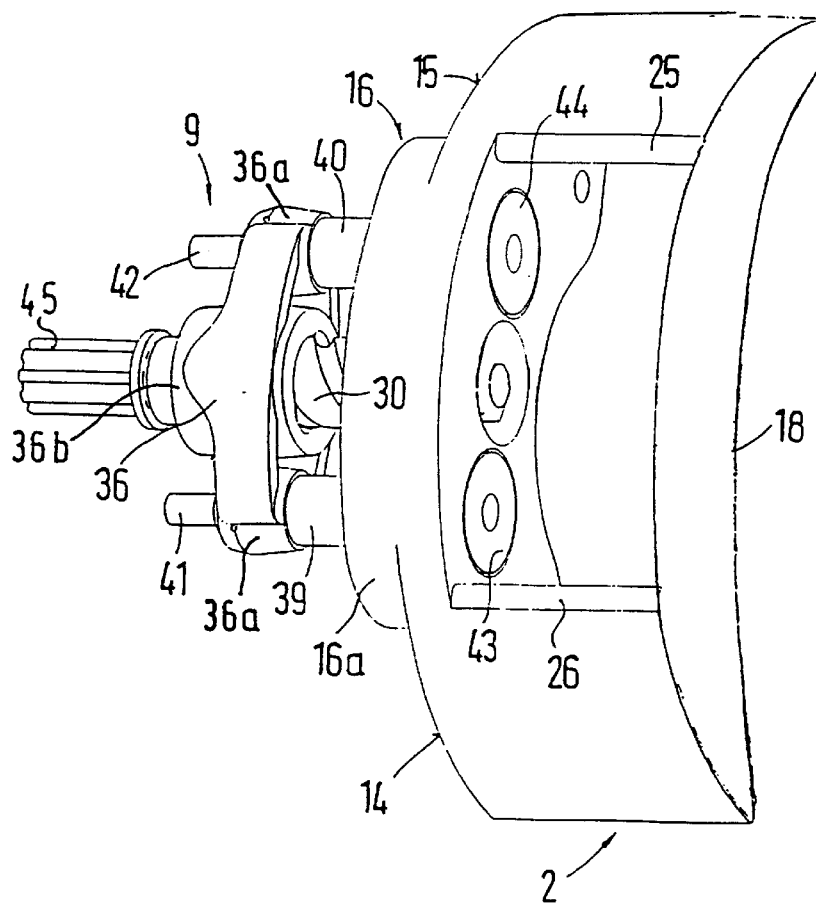
FIG. 6 is a diagrammatic representation of the caliper with the adjusting device.

When either the drive shaft 45 or the spindle 30 of the adjusting device 9 rotates, the adjusting device will rotate and by way of the yoke 36 operate the pressure pistons 39, 40 and displace the pistons jointly in the direction of the arrow 46 (see FIG. 4) so that the brake linings engage the brake disks. The brake disks 3 and 4 are pressed against the stationary supporting plate 18 of the caliper 2 and against the brake linings and a braking operation is initiated. In a multi-disk brake such as that shown in FIG. 2, the brake lining 5 carries out an application movement with respect to the brake disk 4, and the brake lining 7 carries out an application movement with respect to the brake disk 3.

As shown, the brake disks 3, 4 are constructed as solid disks. They may also be constructed as internally ventilated brake disks or may be used in combination with solid disks. In the braking device 1, the number of brake disks must be selected according to particular requirements. Three, four or more brake disks may be used.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Braking device for a wheel of a vehicle comprising:
   a caliper with brake linings guided therein,
   at least one brake disk arranged between the brake linings which is axially displaceable in a non-rotatable manner with respect to the wheel, and
   a pneumatically operable adjusting device, which has an exclusively rotationally movable drive shaft as a mechanical transmission element, for generating a pressure of the brake linings on the brake disk,
   wherein the calioer is constructed as a fixed caliper and, when the adjusting device is operating, only one of the brake linings, arranged on opposite sides of the at least one brake disk, carries out an application movement,
   wherein the adjusting device comprises a ball screw with a ball screw spindle, which is caused to rotate by the drive shaft, and a corresponding yoke, the ball screw being constructed for generating an axially acting pressure of the brake linings onto the brake disk, and
   wherein the ball screw spindle is arranged in an axially non-displaceable manner with respect to an axle element.

2. Braking device according to claim 1, wherein the yoke is constructed as a ball screw nut for transmitting axial movement of the ball screw onto pressure pistons.

3. Braking device for a wheel of a vehicle comprising:
   a caliper with brake linings guided therein,
   at least one brake disk arranged between the brake linings which is axially displaceable in a non-rotatable manner with respect to the wheel, and
   a pneumatically operable adjusting device, which has an exclusively rotationally movable drive shaft as a mechanical transmission element, for generating a pressure of the brake linings on the brake disk,
   wherein the caliper is constructed as a fixed caliper and, when the adjusting device is operating, only one of the brake linings, arranged on opposite sides of the at least one brake disk, carries out an application movement,
   wherein the adjusting device comprises a ball screw with a ball screw spindle, which is caused to rotate by the drive shaft, and a corresponding yoke, the ball screw being constructed for generating an axially acting pressure of the brake linings onto the brake disk, and
   wherein the adjusting device comprises at least two pressure pistons, which are directly operatively connected with the ball screw spindle by way of the yoke, the ball screw spindle, on the one hand, being rotatably disposed in a first bearing of a housing and, on the other hand, by its facing-away free end, being rotatably disposed in another bearing of a bearing plate of the caliper.

4. Braking device for a wheel of a vehicle comprising:
   a caliper with brake linings guided therein,
   at least one brake disk arranged between the brake linings which is axially displaceable in a non-rotatable manner with respect to the wheel, and
   a pneumatically operable adjusting device, which has an exclusively rotationally movable drive shaft as a mechanical transmission element, for generating a pressure of the brake linings onto the brake disk,
   wherein the caliper is constructed as a fixed caliper and, on one end, is connected by a fastening element with an axle element and, on a bearing plate of the caliper, a housing is fastened for bearing a mechanical adjusting device comprising a ball screw with a drive shaft, and
   wherein, on the housing, as well as on the bearing plate, the adjusting device is supported so that, by a yoke, pressure pistons, which can be jointly acted upon by pressure, are guided in an axially adjustable manner with respect to the brake linings and the at least one brake disk.

5. Braking device according to claim 4 wherein the pressure pistons are arranged at a distance from the two sides of a spindle of the ball screw in a common plane with the ball screw spindle.

6. Braking device according to claim 5, wherein the ball screw spindle is arranged to be offset approximately axially in parallel to an axis of rotation of the at least one brake disk.

7. Braking device according to claim 4, wherein the pressure pistons have piston heads which are disposed in the bearing plate of the caliper, the pressure pistons having ends facing away which are connected with the yoke, each of the pressure pistons being held in an axially displaceable manner on stationary guide pins fastened in the housing.

8. Braking device according to claim 4, and further comprising respective slide bearings arranged in sleeves of the pressure pistons, and additional slide bearings for the pistons provided in the bearing plate of the caliper.

9. Braking device according to claim 6, wherein one end of the spindle is rotatably supported by a butting disk in the bearing plate of the caliper and forms an abutment for the spindle.

10. Braking device according claim 6, wherein the ball screw spindle is supported by its driving end facing away from the bearing plate in a threaded neck of the housing by a butting disk and said butting disk is arranged opposite a flange ring of the spindle and forms an abutment in the housing.

11. Braking device according to claim 10, wherein an end of the spindle opposite said driving end is axially non-displaceably rotatably held in a bearing of the bearing plate and is connected with the bearing plate by a lock nut.

12. Braking device according to claim 4, wherein the yoke is constructed in one piece and, in a thickened center part, has ball races arranged to correspond with a thread of the spindle, said yoke also having legs which project to both sides and in which the pressure pistons are fixedly held.

13. Braking device according to claim 5, wherein the spindle is constructed as a threaded spindle.

14. Braking device according to claim 4, wherein the bearing plate of the caliper comprises side legs which are detachably connected with the fastening element and from which the caliper extends in a freely projecting manner toward an end of a wheel hub.

15. Braking device according to claim 14, wherein the bearing plate of the caliper is situated parallel to and opposite a supporting plate of the caliper which has an interior surface constructed with ribs.

16. Braking device according to claim 15, wherein the caliper has a caliper bridge with opposite guiding edges for the brake linings between the bearing plate and the supporting plate.

17. Braking device according to claim 14, wherein said at least one brake disk is axially displaceably guided on the wheel hub by at least one driving toothing constructed as an involute toothing.

18. Braking device according to claim 4, wherein the at least one brake disk includes at least one internally ventilated brake disk.

19. Braking device according to claim 4, wherein the caliper is a multi-part fixed caliper.

* * * * *

UNITED STATES PATENT AND TRADEMARK OFFICE
CERTIFICATE OF CORRECTION

PATENT NO.    : 6,186,286 B1
DATED         : February 13, 2001
INVENTOR(S)   : Harald Häussler et al.

It is certified that error appears in the above-identified patent and that said Letters Patent is hereby corrected as shown below:

<u>Title page,</u>
Should read -- [73] Dr. Ing. h.c.f. Porsche AG, Weissach (DE);
BPW Bergische Achsen Kommanditgesellschaft, Wiehl (DE) --.

Signed and Sealed this

Twenty-eighth Day of May, 2002

Attest:

JAMES E. ROGAN
*Attesting Officer*     *Director of the United States Patent and Trademark Office*